United States Patent [19]

Bott

[11] Patent Number: 4,460,116

[45] Date of Patent: Jul. 17, 1984

[54] VEHICLE ARTICLE CARRIER

[76] Inventor: John A. Bott, 931 Lakeshore Dr., Grosse Pointe, Mich. 48236

[21] Appl. No.: 335,703

[22] Filed: Dec. 30, 1981

[51] Int. Cl.³ .............................................. B60R 11/00
[52] U.S. Cl. .................................. 224/321; 224/324; 224/325; 224/326
[58] Field of Search ............... 224/321, 323, 324, 325, 224/326

[56]  References Cited
U.S. PATENT DOCUMENTS

| | | | |
|---|---|---|---|
| 3,102,708 | 9/1963 | Crain | 248/361 |
| 3,542,264 | 11/1970 | Meyer | 224/42.34 |
| 3,931,919 | 1/1976 | Gerber et al. | 224/324 |
| 4,015,760 | 4/1977 | Bott | 224/42.1 D |
| 4,099,658 | 7/1978 | Bott | 224/42.1 F |
| 4,132,335 | 1/1979 | Ingram | 224/42.1 F |
| 4,162,755 | 7/1979 | Bott | 224/326 |
| 4,222,508 | 9/1980 | Bott | 224/326 X |
| 4,239,139 | 12/1980 | Bott | 224/324 |
| 4,264,025 | 4/1981 | Ferguson | 224/321 |
| 4,274,568 | 6/1981 | Bott | 224/319 |
| 4,295,587 | 10/1981 | Bott | 224/321 |
| 4,358,037 | 10/1982 | Heideman | 224/325 X |
| 4,364,500 | 12/1982 | Bott | 224/321 X |

Primary Examiner—Steven M. Pollard
Attorney, Agent, or Firm—Harness, Dickey & Pierce

[57]  ABSTRACT

An article carrier system for supporting and securing articles on a generally horizontally extending exterior body surface of an automobile comprising at least two elongated slats fixedly secured to the surface, extending in positions substantially parallel to one another, and having article supporting surfaces on the upper sides thereof, at least one elongated cross member extending transversely of the slats and having end portions slideable along the lengths of the slats and removably mounted on the slats, and at least one tie down and/or positioning member slideably and adjustably disposed on the cross member or one of the slats, including a mechanism for clampingly engaging the tie down and/or positioning member in selected positions along the length of the cross member or slat.

17 Claims, 16 Drawing Figures

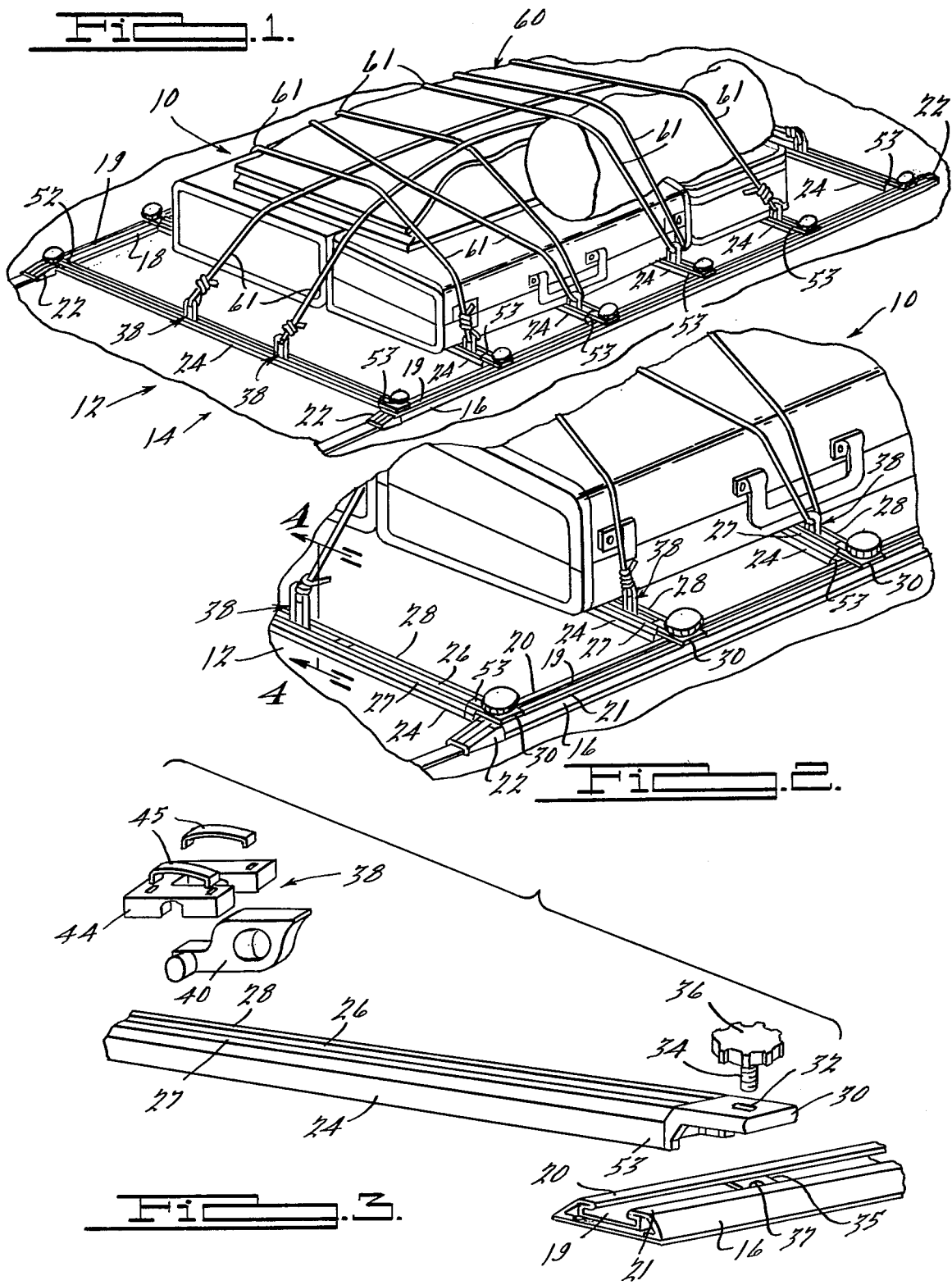

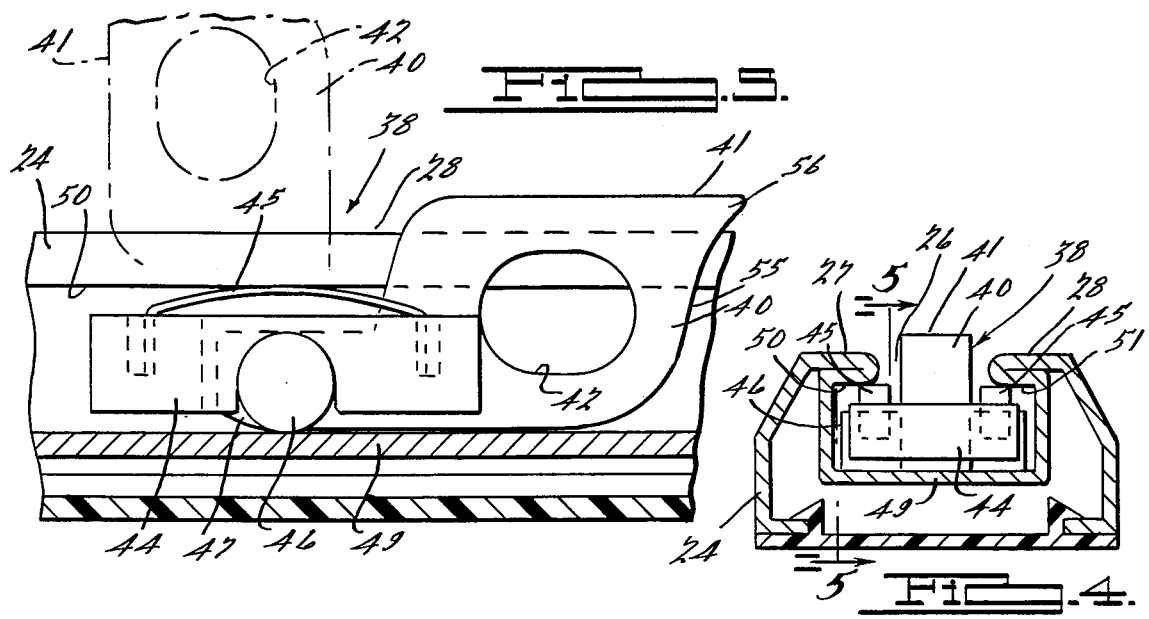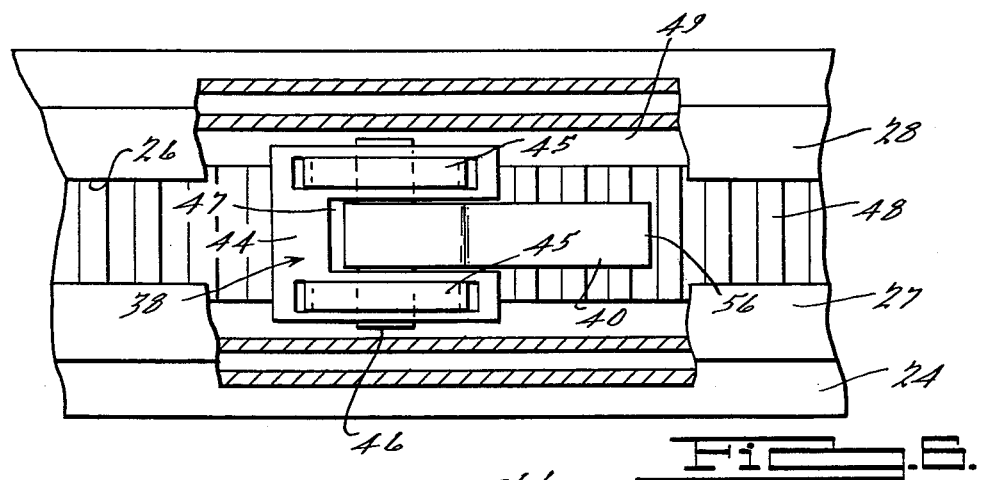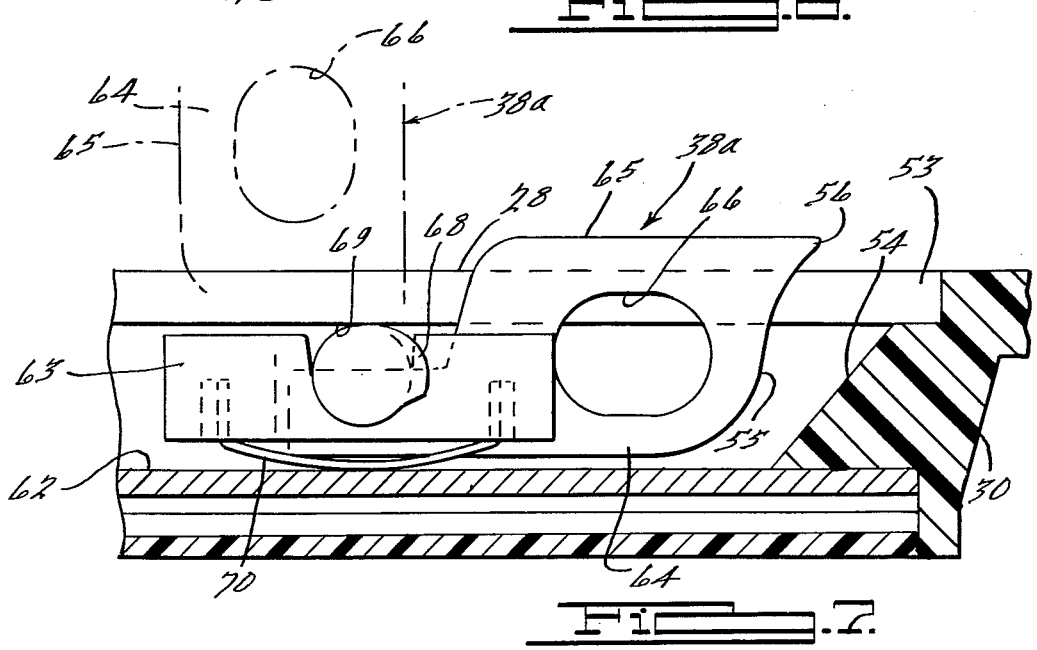

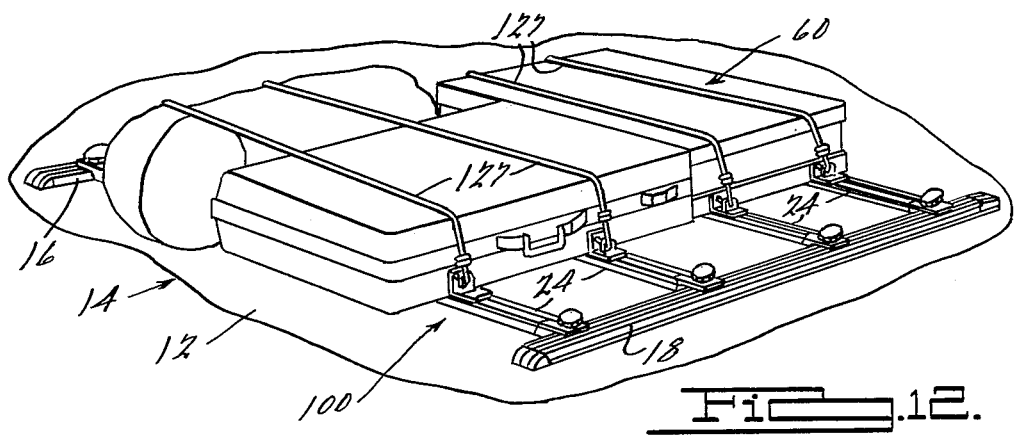
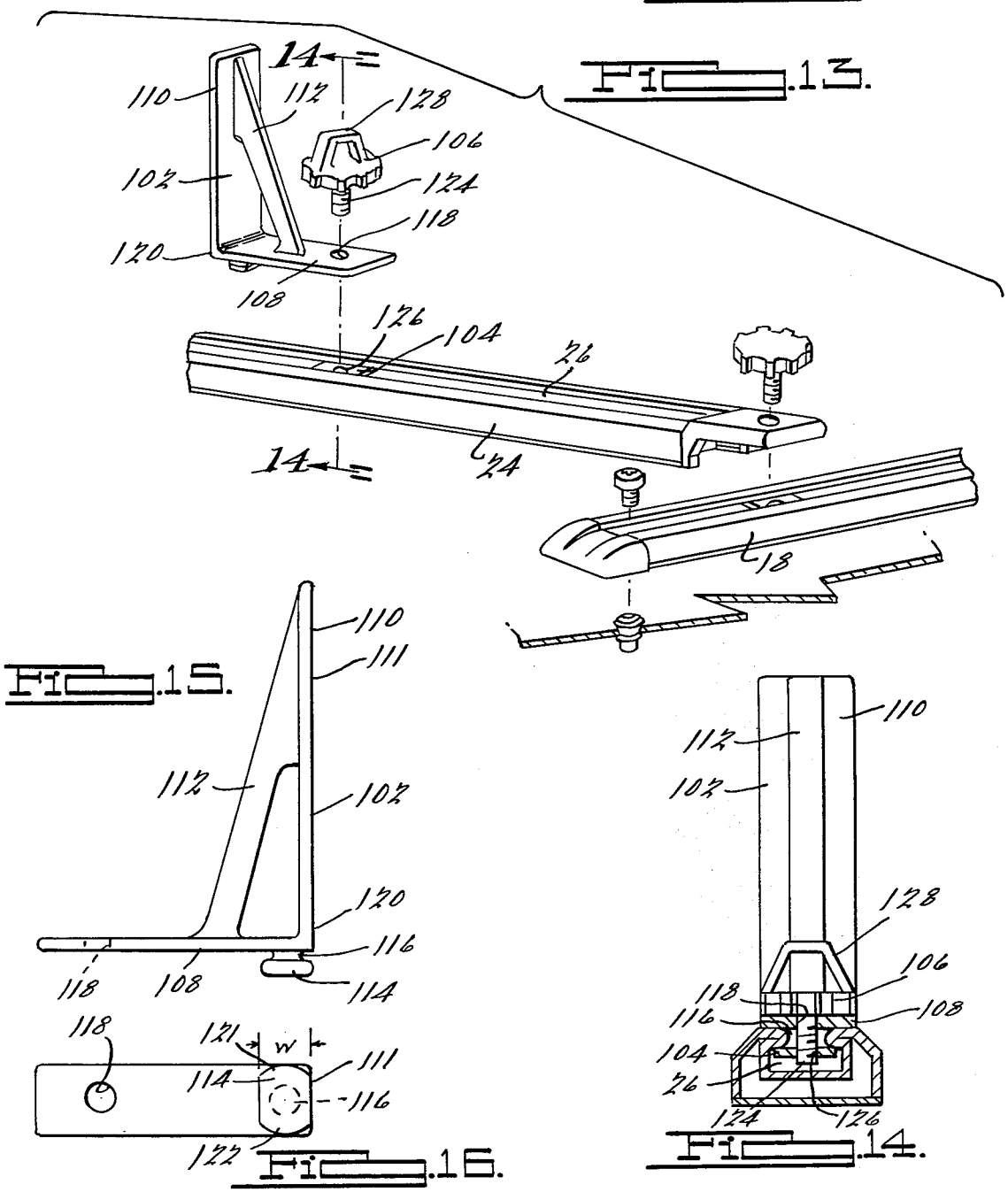

VEHICLE ARTICLE CARRIER

BACKGROUND AND SUMMARY OF THE INVENTION

The present invention relates generally to vehicle article or luggage carriers and more particularly to a new and improved vehicle luggage carrier of the type shown in applicant's U.S. Pat. No. 4,099,658, issued July 11, 1978. Generally, the article carrier of the present invention is of the type which comprises two or more slat-type elements which are fixedly secured to an exterior horizontal surface of a vehicle, such as a trunk lid or vehicle roof, and which are permanently attached thereto and adapted to have ancillary article constraining members removably and adjustably secured thereto.

The present invention has as one principle object to provide a luggage rack with slidably adjustable and fixedly engageable components including slidably adjustable positioning abutments and/or tie downs for boxes, luggage, and the like. The abutments and/or tie downs of the present invention are not only adjustable but also are either removable from the luggage carrier or stored within the slats of the luggage carrier substantially out of view. Each abutment may include at least one tie down member for optimum securement of articles or luggage to the article carrier and thereby the vehicle.

A significant advantage of the article carrier of the present invention is that the article carrier has a low profile when not in use with nothing substantially above the plane of the vehicle surface to which the luggage carrier is attached, thereby minimizing any adverse wind noise or fuel economy effects that would exist with any portion of the carrier being substantially vertically elevated.

The present invention further incorporates all of the aesthetically appealing features and the myriad of functional features and optional accessories disclosed in the slat-type luggage carriers of applicant's prior patents, such as that described in U.S. Pat. No. 4,099,658, referenced above.

In one set of embodiments of the present invention, the tie down and positioning or abutment elements are stored within the article carrier substantially out of view to minimize wind resistance and any adverse noise or fuel economy effects. The tie downs and/or abutments are slidable, adjustable, and fixedly engageable in place, and also include a means for facilitating vertical disposition of the tie down and/or abutment prior to selecting a position and fixedly engaging the tie down in that selected position. This set of embodiments optionally may incorporate adjustable elevated cross rails or side rails to aid in confining luggage or other articles on the luggage carrier.

The second set of embodiments of the present invention as described herein includes positioning or abutment members slidable in the cross rails or cross members of an associated luggage rack, and readily removable from the luggage rack when not in use. A dual tie down effect is included with the positioning or abutment members. Again the aesthetically appealing features of the prior slat-type luggage racks invented by applicant can be utilized with the slidable, adjustable, removable, and fixedly engageable abutment and/or tie down members of the luggage carrier of the present invention.

Other objects and advantages of the present invention will become apparent from the following detailed description taken in conjuction with the following drawings.

BRIEF DESCRIPTION OF THE DRAWINGS

FIG. 1 is an elevated perspective view of a luggage carrier of the present invention;

FIG. 2 is an enlarged elevated perspective view of a corner of the luggage carrier of FIG. 1;

FIG. 3 is an exploded perspective view of a portion of the luggage carrier of FIG. 2;

FIG. 4 is a vertical sectional view along the line 4—4 of FIG. 2 with the tie down and/or positioning member disposed in a stored position;

FIG. 5 is a vertical sectional view along the line 5—5 of FIG. 4;

FIG. 6 is an elevated plan view of the device illustrated in FIGS. 4 and 5, having a portion of the slat broken away;

FIG. 7 is a view similar to FIG. 5 of an alternative embodiment of the present invention;

FIG. 12 is an elevated perspective view of a further alternative embodiment of the luggage carrier of the present invention;

FIG. 13 is an enlarged and exploded view of a corner of the luggage carrier of FIG. 12;

FIG. 14 is a vertical sectional view of an assembled portion of the luggage carrier of FIG. 12 along the lines 14—14 of FIG. 13;

FIG. 15 is an elevated side view of the tie down and/or positioning portion of FIG. 12; and FIG. 16 is an elevated bottom view of the tie down and/or positioning portion illustrated in FIG. 15.

DETAILED DESCRIPTION OF THE PREFERRED EMBODIMENTS

Figure 9:
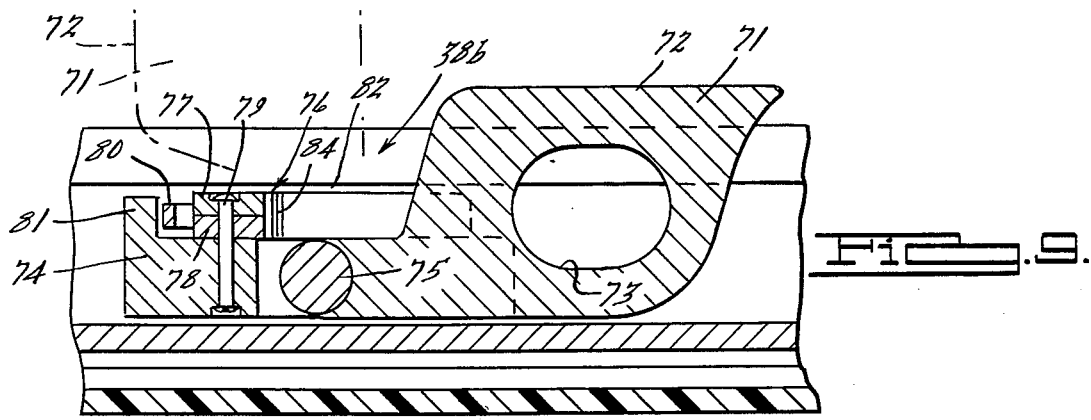
FIG. 9 is a vertical sectional view of the embodiment illustrated in FIG. 8 taken along the line 9—9 of FIG. 8.

Referring now in detail to the drawings and in particular to FIGS. 1-5 thereof, a vehicle luggage carrier 10 is shown in operative association with a generally horizontally disposed roof portion 12 of a typical automotive vehicle 14. Generally speaking, the luggage carrier 10 comprises a pair of laterally spaced, longitudinally extending slats 16 and 18 which are secured upon the roof portion 12 at positions adjacent the lateral sides or edges thereof. Preferably, the slats 16, 18 are of uniform cross sectional shape along the entire length thereof. Channels 19 are defined within the slats 16, 18 and are co-extensive of the length of the slats 16, 18. The slats 16, 18 are fixedly secured to the vehicle roof portion 12 by means of suitable longitudinally spaced fastening elements (not shown) which extend downwardly through suitable openings in the base of the slats 16, 18 and are secured to suitable fastening elements mounted within the roof portion 12. Preferably, a suitable resilient or elastomeric pad is provided interjacent the underside of the slats 16, 18 and the confronting portion of the vehicle roof 12. The slats 16, 18 each include upper article supporting surfaces 20 and 21 extending longitudinally on the slats 16, 18. Additionally, the opposite ends of each of the slats 16, 18 are provided with suitable end caps 22 which may be secured in place by the same fastening elements which secure the slats 16, 18 to the roof portion 12.

The luggage rack 10 in many general respects is similar to the luggage racks described in applicant's U.S. Pat. Nos. 4,099,658, issued to applicant July 11, 1978, and 4,239,139, issued to applicant on Dec. 16, 1980. The luggage carrier 10 further comprises a plurality of transversely or laterally extending cross members or cross slats, generally designated with the numeral 24, which also include a longitudinally extending channel 26 having upper article support surfaces 27 and 28 associated on both sides of the channel 26 and clamping means associated within the interior of the channel 26. Each of the cross slats 24 is provided with an end fitting 30 which is provided with a suitable aperture 32 through which a suitable threaded stud 34 may extend for threadable engagement with a clamping element 35 of the associated slat 16 or 18. The vertically upper portion of the threaded stud 34 comprises a manually engageable portion 36. Thus, the cross slats 24 are slidable longitudinally along the slats 16, 18 to be positioned operably at any location along the length of the slats 16, 18. Cross members 24 are also readily removable by removal of the threaded studs 34 from the threaded apertures 37 of the clamping element 35 of the slats 16, 18.

Within each of the cross members 24 are disposed slidable tie down/positioning members 38. Although only illustrated in association with the cross members 24, the tie down/positioning members 38 are also readily capable of similar asociation with the channel 19 of one of the slats 16, 18. Referring more particularly to FIGS. 4 to 6, tie down/positioning members 38 include an upper section 40 having a vertically disposeable abutment surface 41 and an aperture 42 therein, a base portion 44 including spring biasing members 45, and a pivot 46 for pivotably associating the upper section 40 with the base portion 44. Upper section 40 also includes a lower cam member 47 on the opposite side of the pivot 46 which can be operably associated with optional serrations 48 in the base 49 of the interior of the channel 26 of the cross member 24. Clamping means fixedly engages the tie down member 38 in a selected position, principally comprising the lower cam member 47, the biasing members 45, and all of the other components of the members 38 operably associating the cam member 47 and biasing members 45, so that pivotal movement of the upper section 40 from the horizontal to the vertical position clamps the biasing members 45 against the clamping surfaces 50, 51 of the slat or cross member.

When not in use, the tie down/positioning members 38 are pivotally disposed to a horizontal position to be stored within the interior of the channel 26 of the cross slat 24. Means for facilitating vertical disposition of the members 38 (FIG. 7) is disposed at the ends 52, 53 of the cross members 24, where a canted or ramp portion 54 is integrated with the end fitting 30 of the cross member 24. The member 38 has an operably associable canted upper portion 55 which may be associated with the canted end member portion 54 so, as the member 38 is slid towards the end portion 30, the canted portions interact to raise the end 56 of the member 38 above the upper surfaces 27, 28 of the cross member 24 and permit the operator to slidably select the position at which the member 38 is to be located and subsequently vertically dispose the members 38 to fixedly engage the member 38 in the selected position.

As illustrated in FIG. 1, the vertically disposed tie down/positioning members 38 are also utilizable as positioning abutments for luggage 60 situated on the luggage carrier 10 against abutment surfaces 41. With the apertures 42 disposed adjacent the luggage 60, the members 38 may also be disposed at the optimum location for both positioning and tie down points. Ropes 61, spider connectors with hooked end portions, elastic ropes with hooked end portions, and the like may be utilized with the tie down function of the members 38 to attach and secure various different types of articles and luggage to be carried on the luggage carrier 10 as illustrated in FIG. 1. Furthermore, clamping means may be disposed adjacent the tie down/positioning members 38 within the slats 16, 18 and cross members 24 to operably associate any of a number of optional accessories, such as bike racks, ski racks, utility boxes, and the like, as desired. Thus, the tie down/positioning members 38 provide at least two additional notable features to the luggage carrier 10 with the option of not diminishing any of the myriad of other features provided for with the base luggage carrier 10.

Figure 8:
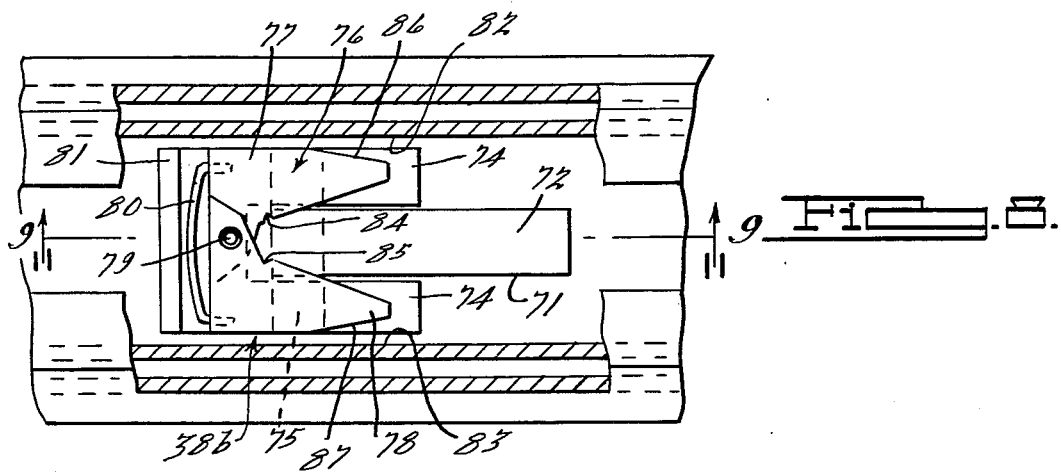
FIG. 8 is an elevated plan view similar to FIG. 6 of still another alternative embodiment of the present invention.

Alternative embodiments of tie down/positioning members 38 are illustrated in FIGS. 7–9. FIG. 7 illustrates a tie down/positioning member 38a where the member 38a clamps principally along clamping surfaces 62 at the bottom of the slat 16 or 18 or cross member 24. The member 38a has a C-shaped base portion 63 in which an upper section 64, having a vertically disposeable abutment surface 65 and an aperture 66 therein, is pivotably disposed on pivot 67. The upper section 64 includes a cam 68 adjacent the pivot 67 thereof. When the upper section 64 is pivoted to a vertically disposed position, the cam 68 is moved against clamping surfaces 69 of the channel of the slat or cross member. Clamping surfaces 69 may have notches or serrations thereon. The base portion 63 has a pair of spring biasing members 70 on the underside thereof which are clampingly engaged with the base clamping surface 62 when the cam 68 is engaged with the clamping surfaces 69, to fixedly but removably locate the member 38a as a tie down and/or an abutment along the length of an elongated slat or cross member.

FIGS. 8 and 9 illustrate an embodiment wherein the clamping engagement of the tie down/positioning member 38b with the slat 16 or 18 or cross member 24 is laterally within the channel of the slat or cross member. The member 38b comprises an upper section 71 having a vertically disposeable abutment surface 72 and an aperture 73 therein, a C-shaped base portion 74, and a pivot 75 for pivotally associating the upper section 71 with the base portion 74. A scissors clamping member 76, having first 77 and second 78 clamping elements, is fixedly engaged to the base portion 74 by rivet 79 about which elements 77 and 78 pivot. Elements 77 and 78 are biased to close by spring 80 as positioned by abutment 81 of base portion 74. As the upper section 71 is moved from its horizontally disposed to its vertically disposed position, elements 77 and 78 are forced outwardly to clampingly engage longitudinally extending clamping surfaces 82 and 83 along the sidewalls of the channel of the slat or cross member. When the vertically disposed position of the upper section 71 is attained, the upper section 71 will engage two notches 84 and 85 in elements 77 and 78, respectively, to secure the upper section 71 in the aforementioned vertical abutment and/or tie down position and clampingly engaged to the slat or cross member. Movement of the upper section from a vertical to a horizontal position releases the clamping engagement of the clamping surfaces 86, 87 of elements 77 and 78 and surfaces 82, 83 to permit slideably adjustable movement of the tie down/positioning member 38b.

Figure 10:
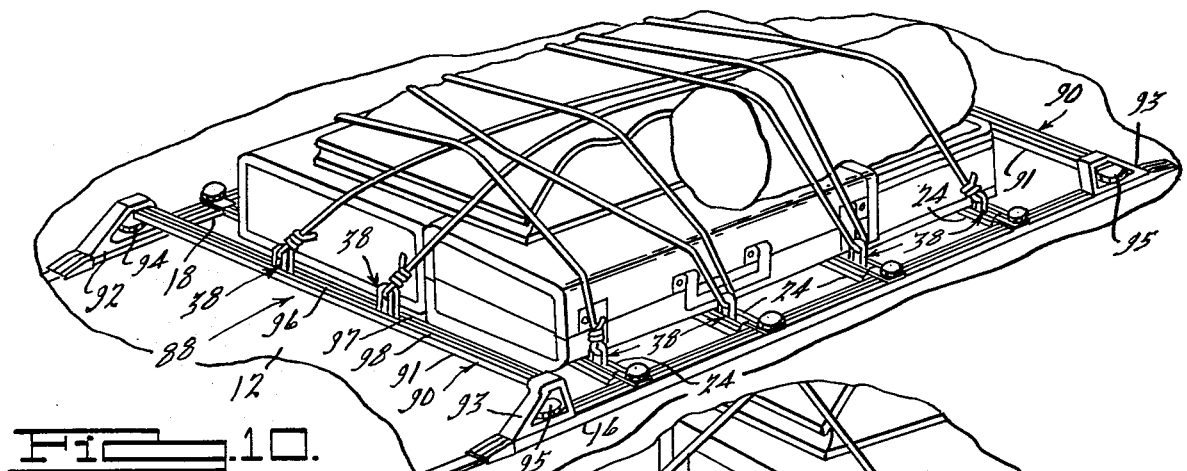
FIG. 10 is an elevated perspective view of an alternative embodiment of the luggage carrier of FIG. 1.
Figure 11:
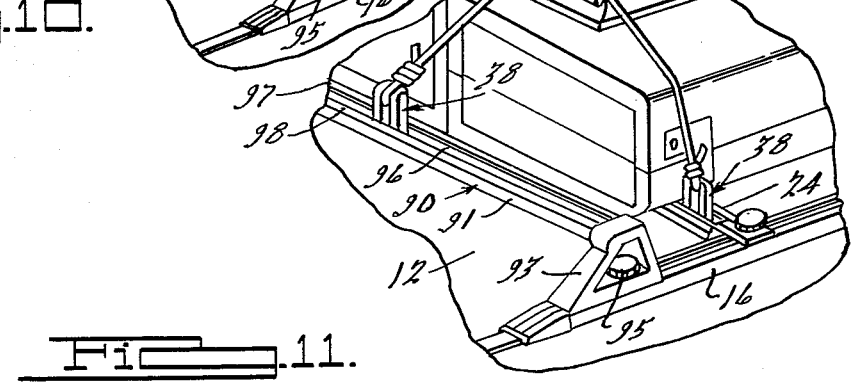
FIG. 11 is an enlarged elevated perspective view of a corner of the luggage carrier of FIG. 10.

Referring to FIGS. 10 and 11, the article carrier 88 illustrated demonstrates that the present invention may also include vertically elevated cross rail members 90 comprising a cross rail 91 mounted between two stanchion elements 92 and 93. The stanchion elements 92, 93 each have an aperture through which is disposed a manually engageable threaded stud 94 or 95, respectively, each of which studs is operably associated with clamping means within the slats 16, 18. The elevated cross rail 91 is preferably of an aerodynamic cross section and includes a longitudinally extending channel 96 including clamping means in the interior thereof and upper support surfaces 97, 98 extending on both sides thereof. Tie down/positioning members 38, 38a, or 38b may be operably associated with the interior portion of channel 96 as described above. The article carrier 88 of FIGS. 10 and 11 also may include a plurality of cross members 24 as described above with respect to the luggage carrier of FIG. 1 secured between the slats 16, 18 in an identical manner.

Referring to FIGS. 12-16, a further alternative embodiment of the present invention is illustrated. A luggage carrier 100 is disposed on the horizontal surface 12 of the vehicle 14 having slats 16 and 18 and cross members 24 identical to the luggage carrier 10 of FIG. 1. Mounted on the cross members 24, and disposed in the interior of the channels 26 thereof, are tie down/positioning members 102 and clamping elements 104, operably associated with rotatable tie downs 106. As illustrated in FIG. 15, the tie down/positioning members 102 each comprise a horizontally disposed portion 108 and a vertically disposed abutment portion 110, having a vertically disposeable abutment surface 111, forming a right angle with bottom portion 108 with a diagonal buttress/tie down portion 112 disposed integrally between bottom portion 108 and vertical portion 110. Bottom portion 108 includes a key 114 integrally associated therewith and secured to the bottom portion by a guide element 116 which has a thickness less than the key portion 114. An aperture 118 is disposed near the end of bottom portion 108 opposite the end 120 with which the vertically disposed portion 110 and the key 114 are operably associated.

Referring to FIGS. 13 and 14, the tie down/positioning member 102 is disposed in the cross member 24 by turning the longitudinal axis of the bottom portion 108 perpendicular to the longitudinal axis of the cross member channel 26 so that the key 114 may be disposed therein. The width (w) of the key 114 is less than the width of the opening of the channel 26. The member 102 is then turned so that the longitudinal axis of the bottom portion 108 is parallel to the longitudinal axis of the cross member channel 26 so that the ends 121 and 122 of the key 114 are disposed within the channel 26. The length between the ends 121 and 122 of the key 114 is greater than the width of the opening of the channel 26. A threaded stud portion 124 of the tie down member 106 is inserted through aperture 118 into engagement with a threaded aperture 126 in the clamping element 104 within the channel of the cross member 24. The tie down/positioning member 102 may be slidably adjusted to any desired position along the length of the cross member 24 at which point the threaded tie down member 106 is threadably secured to the clamping element 104 to engage the tie down/positioning member 102 in position. Once the series of members 102 are engaged in desired positions, rope 127, spider connectors, elastic hook connectors, or the like may be secured to either the loop 128 of the threaded tie down member 104 or the buttress 112 of the tie down/positioning member 102 to secure luggage or other articles 60 to the luggage carrier 100. Again, the clamping elements 104 may be operably associated with any suitable optional accessory such as bike racks, ski racks, utility boxes, and the like so that the tie down/positioning member 102 does not preclude the use of any optional accessory compatible with the luggage carrier, as desired.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

I claim:

1. An article carrier system for supporting and securing articles on a generally horizontally extending exterior body surface of an automobile, comprising a pair of elongated slats on said surface extending in positions substantially parallel to one another, means permanently securing said slats to said body in said positions, said slats being substantially rectangular in vertical cross section with a width substantially greater than the height of the section, the tops of said slats being substantially flat and parallel to said horizontal surface and providing means on which articles may be rested and supported above said surface, at least one elongated cross member extending transversely of said slats and having end portions slideable along the lengths of the respective slats and removeably mounted on said slats, and abutment means for positioning articles on said article carrier system slideably and adjustably disposed on said at least one cross member comprising a base portion disposed within said channel, a vertically disposeable abutment member pivotally attached to said base portion to pivot between a vertically disposed abutment position and a horizontally disposed storage position with at least a portion of said abutment member in said storage position being disposed within said channel, and including means for clampingly engaging said abutment means in selected positions along the length of said at least one cross member comprising means for biasing said base portion of said abutment means away from said clamping surfaces of said channel and means operable in response to the placement of said abutment member in said vertically disposed position for clampingly engaging said biasing means against said clamping surfaces to clampingly engage said abutment means to said cross member.

2. An article carrier system in accordance with claim 1, wherein said abutment means includes means for tying down articles disposed on said article carrier system.

3. An article carrier system for supporting and securing articles on a generally horizontally extending exterior body surface of an automobile, comprising a pair of elongated slats on said surface extending in positions substantially parallel to one another, means permanently securing said slats to said body in said positions, said slats being substantially rectangular in vertical cross section with a width substantially greater than the height of the section, the tops of said slats being substantially flat and parallel to said horizontal surface and providing means on which articles may be rested and supported above said surface, and abutment means for positioning articles on said article carrier system slideably and adjustably disposed on at least one of said slats comprising a base portion disposed within said channel, a vertically disposeable abutment member pivotally attached to said base portion to pivot between a vertically disposed abutment position and a horizontally disposed storage position with at least a portion of said abutment member in said storage position disposed within said channel, and including means for clampingly engaging said abutment means in selected positions along the length of said at least one slat comprising means for biasing said base portion of said abutment means away from said clamping surfaces of said channel and means operable in response to the placement of said abutment member in said vertically disposed position for clampingly engaging said biasing means against said clamping surfaces to clampingly engage said abutment means to said slat.

4. An article carrier adapted to be secured to a generally horizontally extending exterior body surface of a motor vehicle, comprising at least one elongated member secured upon the surface of said vehicle, having upper article supporting surfaces on the upper sides of said elongated member, a longitudinally extending channel, and clamping surfaces extending longitudinally within the interior of the channel interior to said elongated member, the improvement comprising:

tie down means for securing articles to said carrier adjustably engaged with said elongated member and including means for clampingly engaging said tie down means in selected positions along the length of said elongated member, said tie down means comprising a base portion disposed within said channel, a vertically disposable tie down member pivotally attached to said base portion to pivot said tie down member between a vertically disposed tie down position and a horizontally disposed storage position with at least a portion of said tie down member in said storage position disposed within said channel, said clamping means being operable in response to pivotally upward movement of said tie down member.

5. An article carrier in accordance with claim 4, wherein said clamping means engages said elongated member with engagement forces between said clamping means and said elongated member directed substantially vertically between said clamping means and said elongated member.

6. An article carrier in accordance with claim 4, wherein said clamping means engages said elongated member with engagement forces between said clamping means and said elongated member directed substantially horizontally between said clamping means and said elongated member.

7. An article carrier adapted to be secured to a generally horizontally extending exterior body surface of a motor vehicle, comprising at least one elongated member secured upon the surface of said vehicle, having upper article supporting surfaces on the upper sides of said elongated member, a longitudinally extending channel, and clamping surfaces extending longitudinally within the interior of the channel interior to said elongated member, the improvement comprising:

tie down means for securing articles to said carrier adjustably engaged with said elongated member and including means for clampingly engaging said tie down means in selected positions along the length of said elongated member, said tie down means comprising a base portion disposed within said channel, a vertically disposable tie down member pivotally attached to said base portion to pivot said tie down member between a vertically disposed tie down position and a horizontally disposed storage position with at least a portion of said tie down member in said storage position disposed within said channel, said means for clampingly engaging comprising clamping surfaces disposed on said base portion of said tie down means and means operable in response to the placement of said tie down member in said vertically disposed position for clampingly engaging the clamping surfaces of said base portion with the clamping surfaces of said channel to clampingly engage said tie down means in a selected position along the length of said elongated member.

8. An article carrier in accordance with claim 7, wherein said base portion includes means for biasing said base portion away from the clamping surfaces of said channel.

9. An article carrier in accordance with claim 8, wherein said clamping surfaces of said base portion are disposed on said biasing means.

10. An article carrier in accordance with claim 7, wherein said tie down means includes abutment means for positioning articles on said article carrier.

11. An article carrier adapted to be secured to a generally horizontally extending exterior body surface of a motor vehicle, comprising at least one elongated member secured upon the surface of said vehicle, having upper article supporting surfaces on the upper sides of said elongated member, a longitudinally extending channel, and clamping surfaces extending longitudinally within the interior of the channel interior to said elongated member, the improvement comprising:

tie down means for securing articles to said carrier adjustably engaged with said elongated member and including means for clampingly engaging said tie down means in selected positions along the length of said elongated member, said tie down means comprising a base portion disposed within said channel, a vertically disposable tie down member pivotally attached to said base portion to pivot said tie down member between a vertically disposed tie down position and a horizontally disposed storage position with at least a portion of said tie down member in said storage position disposed within said channel, said tie down means being slideable along the length of said elongated member, and said article carrier further comprises means for facilitating disposition of said tie down member from said horizontal position to said vertical position in reponse to sliding movement of said tie down means to one end of said elongated member.

12. An article carrier in accordance with claim 11, wherein said facilitating means comprises ramp means disposed within said channel at at least one end of said elongated member and said tie down member is slid into engagement with said ramp means to move said tie down member from said horizontal disposition towards said vertical disposition of said tie down member.

13. An article carrier adapted to be secured to a generally horizontally extending exterior body surface of a motor vehicle, comprising at least two elongated spaced parallel slats fixedly secured directly upon said surface of said vehicle and having a low profile against said surface, at least two elongated spaced parallel cross members adjustably and removably secured to said slats, each of said slats and said cross members being of greater width than height in transverse cross section, with said width extending parallel to said body surface, said slats and cross members having upper article supporting surfaces and longitudinally extending upwardly opening channels, with said suporting surfaces on the upper sides of said slats, and clamping surfaces extending longitudinally within the interior of said channels interior to said slats, the improvement comprising:

adjustable abutment means disposed within said channels for positioning articles on said carrier, said abutment means including clamping means for clampingly engaging said abutment means with either one of said slats or said cross members and engageable with the clamping surfaces of said channelled slats and cross members in response to movement of said abutment means upwardly from said slat, said abutment means being slidably adjustably movable longitudinally within said slats and cross members for positioning said abutment means along the length of an associated slat or cross member; and tie down means, operably associated with said abutment means, for securing articles to said carrier.

14. A carrier in accordance with claim 1, further comprising manually engageable means for clampingly engaging said abutment means to said slats or cross members, secured to said abutment means and having one end projecting into said channel from a position above said support surfaces.

15. An article carrier system for supporting and securing articles on a generally horizontally extending exterior body surface of an automobile, comprising a pair of elongated slat-like elements on said surface extending in positions substantially parallel to one another, means permanently securing said slat-like elements to said body in said positions, said slat-like elements being substantially rectangular in vertical cross section with a width substantially greater than the height of the section, the tops of said slat-like elements being substantially flat and parallel to said horizontal surface and providing means on which articles may be rested and supported above said surface, said slat-like elements further comprising a longitudinally extending channel having at least one clamping surface associated therewith, at least one elongated cross member extending transversely of said slat-like elements and having end portions slideable along the lengths of the respective slat-like elements and mounted in association with said slat-like elements, and abutment means for positioning articles on said article carrier system disposed on said slat-like elements comprising a base portion disposed within said channel, a vertically disposeable abutment member having one end engageable with said at least one clamping surface, said member being pivotally attached to said base portion and said member having a pivot element disposed at an intermediate location to pivot said member between a vertically disposed abutment position and a horizontally disposed storage position with at least a portion of said abutment member in said storage position being disposed within said channel, and including means for clampingly engaging said abutment means comprising means operable in response to the placement of said abutment member in said vertically disposed position for clampingly engaging said one end of said abutment means against said at least one clamping surface to clampingly engage said abutment means to said cross member.

16. An article carrier adapted to be secured to a generally horizontally extending exterior body surface of a motor vehicle, comprising at least one elongated member secured upon the surface of said vehicle, having upper article supporting surfaces on the upper sides of said elongated member, a longitudinally extending channel, and clamping surfaces extending longitudinally within the interior of the channel interior to said elongated member, the improvement comprising:

a tie down member for securing articles to said carrier comprising a base portion disposed within said channel, a vertically disposable tie down element pivotally disposed within said channel to pivot said tie down element at an intermediate position of said element between a vertically disposed tie down position and a horizontally disposed storage position with at least a portion of said tie down element in said storage position disposed within said channel, and means for clampingly engaging said tie down element to said elongated member in a vertically disposed position operable in response to pivotally upward movement of said tie down element.

17. An article carrier adapted to be secured to a generally horizontally extending exterior body surface of a motor vehicle, comprising at least two elongated spaced parallel slats fixedly secured directly upon said surface of said vehicle and having a low profile against said surface, at least one elongated spaced parallel cross member adjustably secured to said slats, each of said slats and said cross member being of greater width than height in transverse cross section, with said width extending parallel to said body surface, said slats and cross member having upper article supporting surfaces and longitudinally extending upwardly opening channels, with said supporting surfaces on the upper sides of said slats, and clamping surfaces extending longitudinally within the interior of said channels interior to said slats and cross member, the improvement comprising:

abutment means disposed within at least one of said channels of one of said slats or cross member for positioning articles on said carrier, said abutment means pivotable at an intermediate point thereof including clamping means for clampingly engaging said abutment means with one of said slats or said cross member and engageable with the clamping surfaces of one of said channelled slats or cross member in response to movement of said abutment means upwardly from said slat; and tie down means, operably associated with said abutment means, for securing articles to said carrier.

* * * * *